United States Patent

Kobayashi et al.

(10) Patent No.: US 7,582,369 B2
(45) Date of Patent: Sep. 1, 2009

(54) BIAXIALLY ORIENTED POLYESTER FILM

(75) Inventors: Jun Kobayashi, Mishima (JP); Yasuo Nishigaki, Mishima (JP)

(73) Assignee: Toray Industries, Inc., Tokyo (JP)

( * ) Notice: Subject to any disclaimer, the term of this patent is extended or adjusted under 35 U.S.C. 154(b) by 354 days.

(21) Appl. No.: 10/589,802

(22) PCT Filed: Feb. 17, 2005

(86) PCT No.: PCT/JP2005/002398

§ 371 (c)(1), (2), (4) Date: Aug. 17, 2006

(87) PCT Pub. No.: WO2005/078010

PCT Pub. Date: Aug. 25, 2005

(65) Prior Publication Data

US 2007/0172682 A1    Jul. 26, 2007

(30) Foreign Application Priority Data

Feb. 17, 2004  (JP)  ............................. 2004-039461
Feb. 18, 2004  (JP)  ............................. 2004-040930

(51) Int. Cl.
*B32B 15/08* (2006.01)
*B32B 15/09* (2006.01)
*B32B 27/36* (2006.01)
*G11B 5/62* (2006.01)
*G11B 5/73* (2006.01)

(52) U.S. Cl. ....................... 428/847; 428/212; 428/457; 428/458; 428/847.2; 428/847.3; 428/480; 428/910; 528/308; 528/308.1; 528/308.6

(58) Field of Classification Search ........................ None
See application file for complete search history.

(56) References Cited

U.S. PATENT DOCUMENTS 5,069,962 A * 12/1991 Okazaki et al. ............. 428/323
5,266,376 A * 11/1993 Okazaki et al. ............. 428/141
5,401,559 A *  3/1995 Okamoto et al. ........... 428/143

(Continued)

FOREIGN PATENT DOCUMENTS

EP           0 347 646     * 12/1989

(Continued)

*Primary Examiner*—Vivian Chen
(74) *Attorney, Agent, or Firm*—Kubovcik & Kubovcik

(57) ABSTRACT

A biaxially oriented polyester film wherein the microscopic Raman crystallization index Ic measured in the film thickness direction is in a range of 8 cm$^{-1}$ to 15 cm$^{-1}$ and the difference between the maximum value and the minimum value of Ic is 1 cm$^{-1}$ or less. Another biaxially oriented polyester film wherein the relative power ($I^{10}{}_{TD}$) of spatial frequency (1/mm) measured along the transverse direction of at least one surface of the polyester film having been heat treated at 100° C. for 24 hours is in a range of −25 to 0 dB. These biaxially oriented polyester films are films good in microplanarity even after high-temperature storage or heat loading during processing. These biaxially oriented polyester films are useful as polyester films for use in a magnetic recording material, an electronic material, a stencil film, a sublimatic ribbon and a package material. In particular, these biaxially oriented polyester films are useful when employed as a base film for a high-density magnetic recording medium, especially, a double layer metal coated digital recording medium according to linear recording system.

6 Claims, 2 Drawing Sheets

Helical recording system

Head running direction

U.S. PATENT DOCUMENTS 5,858,507 A * 1/1999 Yoshida et al. ............... 428/141
6,197,430 B1 * 3/2001 Asakura et al. ........... 428/847.2
7,026,064 B1 * 4/2006 Tsunekawa et al. ...... 428/847.4

FOREIGN PATENT DOCUMENTS

| EP | 0 679 508 | * | 11/1995 |
| EP | 1 273 428 A1 | | 1/2003 |
| JP | 63-230740 | * | 9/1988 |
| JP | 02-143836 | * | 6/1990 |
| JP | 2-143836 A | | 6/1990 |
| JP | 03-140336 | * | 6/1991 |
| JP | 06-256544 | * | 9/1994 |
| JP | 08-030958 | * | 2/1996 |
| JP | 2001-121602 | * | 5/2001 |

* cited by examiner

Helical recording system

Head running direction

Linear recording system

Head
Tape

Head running direction

BIAXIALLY ORIENTED POLYESTER FILM

This application is a 371 of international application PCT/JP2005/002398, which claims priority based on Japanese patent application Nos. 2004-039461 and 2004-040930 filed Feb. 17 and Feb. 18, 2004, respectively, which are incorporated herein by reference.

TECHNICAL FIELD OF THE INVENTION

The present invention relates to a polyester film used for a magnetic recording material, an electronic material, a stencil film, a sublimated type ribbon and a package material. Specifically, the present invention relates to a biaxially oriented polyester film useful particularly when employed as a base film for a high-density magnetic recording medium, especially, a double layer metal coated digital recording medium according to linear recording system.

BACKGROUND ART OF THE INVENTION

Recently, a magnetic recording medium such as one for data storage or digital video tapes becomes a high-density and high-capacity magnetic recording medium. Generally, as recording systems used for such a magnetic recording medium, there are a helical scan type recording system as shown in FIG. 1 and a linear recording system as shown in FIG. 2. In the helical scan type recording system, a tape is pulled out from a cartridge having two reels, a cylindrical head rotating at a high speed is scanned, and the reading/writing is carried out obliquely relative to the tape. In the linear recording system, a tape is guided to a head from a cartridge having one reel, and the reading/writing is carried out at straight lines relatively to the tape in the longitudinal direction. Although the linear recording system is low in recording density as compared with the helical scan type recording system, because the winding of the tape relative to the head is loose, damage to the tape is little, and it has a high reliability for data storage.

Recently, in LTO (Linear Tape Open) or SDLT (Super Digital Linear Tape) employing such a linear recording system, one having a high capacity of 100 GB or more per one reel has been developed.

For making the capacity high, generally there are three methods of a method for increasing the number of tracks, a method for setting a recording wavelength at a shorter wavelength, and a method for increasing a tape length.

If the number of tracks is increased, because the width of one track becomes small, it becomes important to control the dimensional stability in the transverse direction of the tape. Further, in order to realize a sufficient electromagnetic conversion property at a condition where the recording wavelength is set at a shorter wavelength, a surface flatness is required. Furthermore, because the size of a cartridge for a magnetic recording medium is basically unchangeable, in order to increase the tape length per one reel, it is necessary to make the tape thinner and accompanying with it to increase the tape strength. From these three points of view, various investigations have been conducted. JP-A-2002-329312, WO/00-076749 and JP-A-2003-67913 describe as to optimization of thermal expansion coefficient and humidity expansion coefficient in the transverse direction of a tape, making the diameter of added particles small, and making a base film strong by increase of a draw ration of stretching or by reinforcement with a metal. However, even if these technologies are employed, a sufficient electromagnetic conversion property has not been able to be obtained for a magnetic recording medium of linear recording system which has a high capacity of 100 GB or more per one reel. As a result so far, it has been clarified that deterioration of microplanarity of the film surface ascribed to high-temperature storage or heat loading during film processing affects the properties of the magnetic recording medium.

Generally in the linear recording system, because the winding of the tape is loose and a force of the head for pushing the tape in its perpendicular direction is weak, a spacing loss is liable to occur as compared with a case of helical recording system. The spacing loss is a nanometer-order gap generated between the head and the tape, and if the spacing loss is great, the electromagnetic conversion property deteriorates. For achieving a high capacity, it is required to make the recording wavelength of a magnetic recording medium small to be lower than 0.6 μm and control the surface more finely. However, in the known art, the investigation is still carried out with properties representing average values of the whole of a film such as a thermal expansion coefficient, a humidity expansion coefficient, a strength and a degree of crystallization. The control of the planarity at a micro level, which is a subject at the present time, has not been able to be carried out.

DISCLOSURE OF THE INVENTION

Problems to be Solved by the Invention

For the above-described problems, an object of the present invention is to provide a film capable of preventing deterioration of the microplanarity of the film surface ascribed to high-temperature storage or heat loading during film processing by controlling a microscopic Raman crystallization index measured in the film thickness direction or a difference between the maximum value and the minimum value of the microscopic Raman crystallization index in a specified range, in particular, a film useful for a high-density magnetic recording medium according to linear recording system.

Means for Solving the Problems

A biaxially oriented polyester film according to the present invention is a biaxially oriented polyester film wherein a microscopic Raman crystallization index Ic measured in the thickness direction of the film is in a range of 8 cm$^{-1}$ to 15 cm$^{-1}$ and a difference between the maximum value and the minimum value of the Ic is 1 cm$^{-1}$ or less.

Further, a biaxially oriented polyester film according to the present invention is a biaxially oriented polyester film wherein a relative power ($I^{10}{}_{TD}$) of spatial frequency 10 (1/mm) measured along the transverse direction of at least one surface of said polyester film having been heat treated at 100° C. for 24 hours is in a range of −25 to 0 dB.

Effect According to the Invention

By the present invention, a film, good in microplanarity even after high-temperature storage or heat loading during processing, can be obtained.

THE BEST MODE FOR CARRYING OUT THE INVENTION

Figure 1:
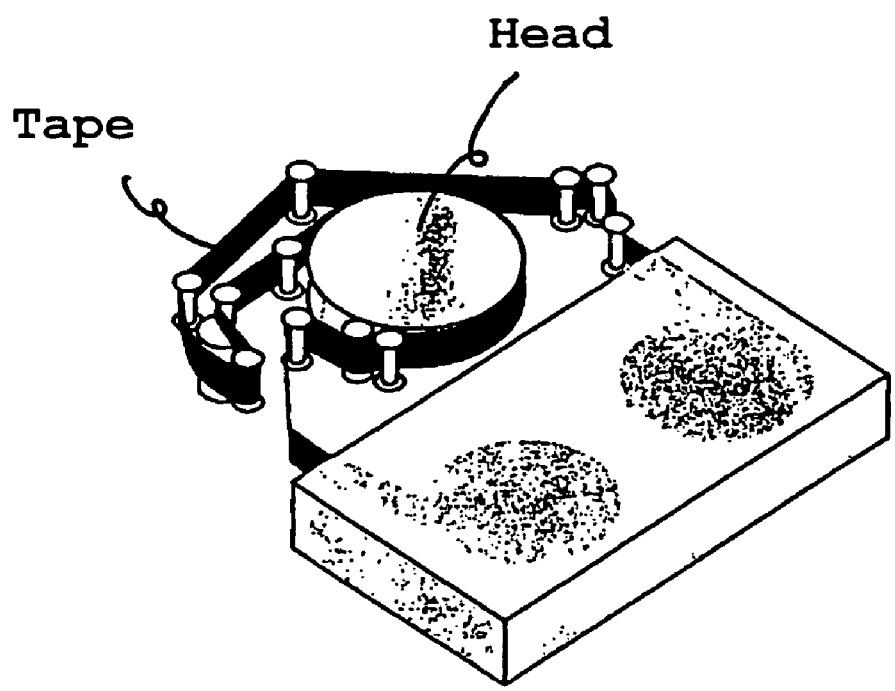
FIG. 1 is a schematic diagram of a general helical scan recording system.
Figure 1:
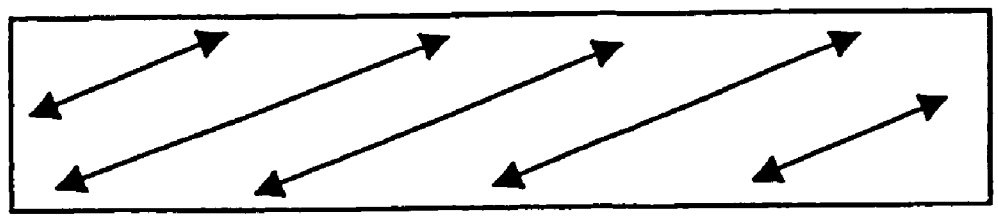
Figure 2:
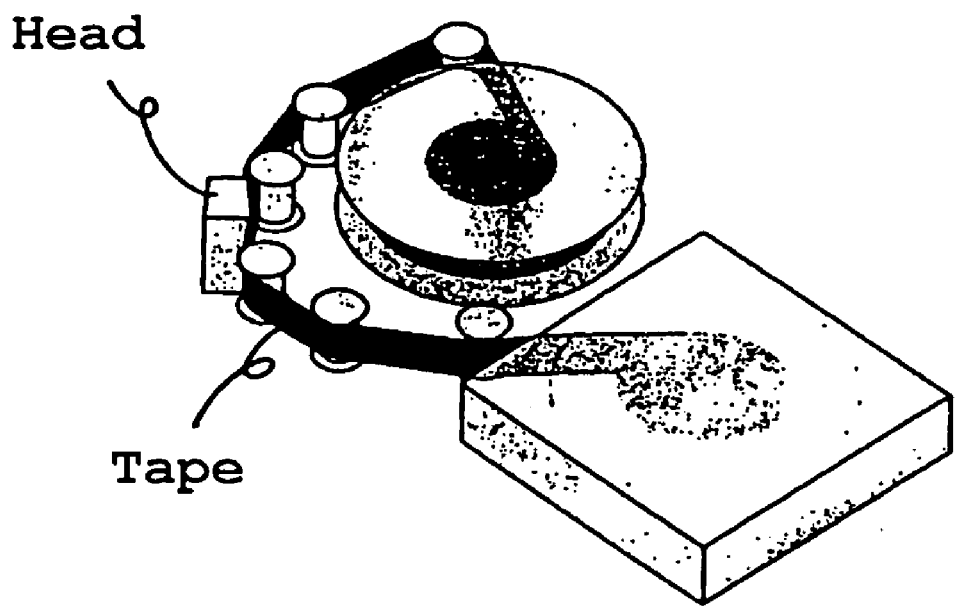
FIG. 2 is a schematic diagram of a general linear recording system.
Figure 2:
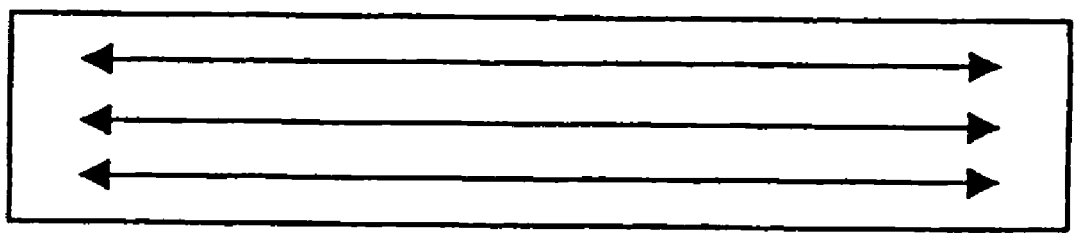

In a biaxially oriented polyester film according to a first embodiment of the present invention, the microscopic Raman crystallization index Ic measured in the thickness direction of the film is in a range of 8 to 15 cm$^{-1}$. The microscopic Raman crystallization index Ic measured in the thickness direction of the film is preferably in a range of 10 to 14.5 cm$^{-1}$, more preferably in a range of 12 to 14 cm$^{-1}$. The microscopic Raman crystallization index can analyze the crystallinity of the film at a unit of micron. It is indicted that, the smaller the microscopic Raman crystallization index is, more stable the structure is. If Ic is more than 15 cm$^{-1}$, the structure does not become stable, shrinkage due to a thermal load occurs and the microplanarity deteriorates. On the other hand, in order to make the structure stable until Ic becomes smaller than 8 cm$^{-1}$, it is necessary to fairly increase a draw ratio of stretching and raise a heat setting temperature, film breakage frequently occurs, and there is a problem in such a condition.

In the biaxially oriented polyester film according to the first embodiment of the present invention, the difference between the maximum value and the minimum value of the Ic in the thickness direction is 1 cm$^{-1}$ or less. The difference between the maximum value and the minimum value of the Ic in the thickness direction is preferably 0.8 cm$^{-1}$ or less, and more preferably 0.5 cm$^{-1}$ or less. If the difference between the maximum value and the minimum value is more than 1 cm$^{-1}$, the degrees of fine heat shrinkage in the thickness direction of the film during heat loading do not become uniform, and the microplanarity of the film surface deteriorates.

In the biaxially oriented polyester film according to the first embodiment of the present invention, from the viewpoint of preventing the unevenness of the shrinkage during heat loading, the difference between the maximum value and the minimum value of a microscopic Raman crystallization index measured in the plane direction of the film is preferably 1 cm$^{-1}$ or less, more preferably 0.8 cm$^{-1}$ or less, and further preferably 0.5 cm$^{-1}$ or less.

The characteristic of the first embodiment of the present invention is to find that the subjects such as the spacing loss and the deterioration of the electromagnetic conversion property in the linear recording system, which has been difficult to be analyzed in the macroscopic measuring items such as heat shrinkage and Young's modulus having been used in the conventional technology, can be represented by the microscopic Raman crystallization index according to a very microscopic measurement. Therefore, even if the heat shrinkage and Young's modulus are same, if the microscopic Raman crystallization index is more than the above-described range, an advantage cannot be obtained.

A biaxially oriented polyester film according to a second embodiment of the present invention is a biaxially oriented polyester film wherein a relative power ($I^{10}{}_{TD}$) of spatial frequency 10 (1/mm) measured along the transverse direction of at least one surface of the polyester film having been heat treated at 100° C. for 24 hours is in a range of −25 to 0 dB. The relative power ($I^{10}{}_{TD}$) of spatial frequency 10 (1/mm) measured along the transverse direction of one surface is preferably in a range of −20 to −1 dB, more preferably in a range of −15 to −5 dB. The relative power is a value normalized on an analyzing soft so that a surface undulation per 1 nm$^2$ is expressed as 0 dB, and it indicates that the greater in the plus side the value is, the worse the microplanarity of the film surface is. The undulation of the film surface determining the microplanarity is classified broadly into two kinds, and there exist a kind of longer wavelength of 100 μm level and a kind of shorter wavelength of 10 μm level. If the intensity of the undulation ($I^{10}{}_{TD}$) of longer wavelength of 100 μm level present in the transverse direction is more than +5 dB, the undulation of longer wavelength becomes too strong, and the electromagnetic conversion property is likely to deteriorate by a spacing loss. Although it is preferred that the undulation of longer wavelength becomes smaller as the ($I^{10}{}_{TD}$) is smaller, a fine undulation due to thermal load inevitably occurs, and the ($I^{10}{}_{TD}$) is substantially a value of −25 dB or more.

Further, if a difference in intensity ($I^{10-200}{}_{TD}$) between the undulation of longer wavelength of 100 μm level represented by the intensity of spatial frequency 10 (1/mm) and the undulation of shorter wavelength of 5 μm level represented by spatial frequency 200 (1/mm) is in a range of 5 to 20 dB, the advantage according to the present invention becomes more remarkable, and such a condition is preferred. More preferably, the ($I^{10-200}{}_{TD}$) is in a range of 6 to 18 dB. The undulation of shorter wavelength of 5 μm level represented by the spatial frequency 200 (1/mm) has a strong correlation with a diameter of particles added to the film, when the ($I^{10-200}{}_{TD}$) is more than 20 dB, it indicates that in the film surface, the undulation of longer wavelength of 100 μm level is more dominant than the undulation of shorter wavelength formed by the added particles. In this condition, there is a case where, when converted into a tape, a spacing loss is generated and the electromagnetic conversion property deteriorates. On the contrary, in a case where the ($I^{10-200}{}_{TD}$) is in a range of 5 to 20 dB, protrusions in accordance with the diameter and content of the added particles are formed adequately, a pacing loss is hard to be generated, and therefore, such a condition is more preferable. On the other hand, it cannot be avoided at the present time that very small undulation of longer wavelength occurs by heat loading, and the ($I^{10-200}{}_{TD}$) substantially becomes a value of 5 dB or more.

The characteristic of the second embodiment of the present invention is to clearly define the undulation of longer wavelength or shorter wavelength determining the microplanarity of the film after heat treatment by the spatial frequency and intensity. By this, it aims to improve the subjects such as the spacing loss and the deterioration of the electromagnetic conversion property in the high-density magnetic recording medium of linear recording system, which has been difficult to explain by the macroscopic value of the sum of the undulations of longer wavelength and shorter wavelength such as WRa having been used in the conventional technology. Therefore, even if the WRa is same, if the ($I^{10}{}_{TD}$) is great, the advantage according to the present invention cannot be obtained.

In the biaxially oriented polyester films according to the first and second embodiments of the present invention, it is preferred that the sum of Young's modulus in the longitudinal direction and Young's modulus in the transverse direction is in a range of 11,000 to 15,000 MPa. The sum of Young's modulus in the longitudinal and transverse directions is more preferably in a range of 11,500 to 14,000 MPa, and further preferably in a range of 12,000 to 13,000 MPa. If the sum of Young's modulus is less than 11,000 MPa, the head contact is weak because of lack of strength, and there is a case where a spacing loss is generated. On the other hand, in order to make it greater than 15,000 MPa, it is necessary to fairly increase a draw ration for stretching, and in such a condition, there is a case where film breakage occurs.

The sum of the heat shrinkage in the longitudinal direction and the heat shrinkage in the transverse direction of the biaxially oriented polyester films according to the first and second embodiments of the present invention is preferably 3.0% or less, more preferably 2.5% or less. If the sum of the heat shrinkages is more than 3.0%, there is a case where the shrinkage of the film during high-temperature storage or heat loading is great, and the microplanarity is likely to deteriorate. In a linear recording system, a tension almost does not operate in the transverse direction of the film. Therefore, in order to suppress the shrinkage in the transverse direction of the tape and prevent the deterioration of microplanarity accompanying therewith, it is preferred to suppress the heat shrinkage in the transverse direction within a range of 0.0 to 1.0%. The heat shrinkage in the transverse direction can be appropriately adjusted by a known method such as relax treatment.

The polyester of the biaxially oriented polyester films according to the first and second embodiments of the present invention is not particularly limited, as long as it is a polyester which becomes a high-strength film by molecular orientation. It is preferred that the polyester film according to the present invention comprises mainly polyethylene terephthalate or polyethylene-2,6-naphthalate. In particular, the polyester film according to the present invention preferably comprises polyethylene terephthalate which is good in creep property. As polyester copolymer components other than polyethylene terephthalate, for example, a diol component such as diethylene glycol, propylene glycol, neopentyl glycol, polyethylene glycol, p-xylilene glycol or 1,4-cyclohexane dimethanol, dicarboxylic component such as adipic acid, sebacic acid, phthalic acid, isophthalic acid or 5-sodium sulfoisophthalic acid, polyfunctional dicarboxylic component such as trimellitic acid or pyromellitic acid, or p-oxyethoxy benzoic acid, can be used.

The biaxially oriented polyester film according to the present invention may be formed either as a single layer or as a lamination structure of two or more layers. For the biaxially oriented polyester film according to the present invention, a two-layer structure is preferable because forming of surface protrusions on the layer (A) applied with a magnetic coating layer when used as a magnetic recording medium and the opposite layer (B) can be easily controlled.

The surface roughness $WRa^A$ of the layer (A) of the biaxially oriented polyester film with a two-layer structure, measured using a non-contact type three dimensional roughness meter, is preferably in a range of 0.2 to 6 nm, more preferably in a range of 0.5 to 4 nm. If $WRa^A$ is less than 0.2 nm, there is a case where the slipping between the head and the tape deteriorates. If more than 6 nm, there is a case where the surface becomes too rough and a sufficient electromagnetic conversion property for a high-density magnetic recording medium cannot be obtained. On the other hand, the surface roughness $WRa^B$ of the layer (B) forming the opposite surface is preferably in a range of 1 to 10 nm, more preferably in a range of 3 to 8 nm. If less than 1 nm, there is a case where wrinkles and the like are generated during film winding and the winding form becomes bad. On the other hand, if $WRa^B$ is more than 10 nm, because the surface becomes too rough, there is a case where, when wound as a film roll, the surface is liable to affect the layer (A) applied with a magnetic layer such as transfer to the layer (A).

Next, in order to satisfy the above-described surface roughness, it is preferred to add inert particles into the layer, and in the inert particles used the layer (A) in the present invention, the mean particle diameter dI is preferably in a range of 0.04 to 0.30 μm, more preferably in a range of 0.05 to 0.10 μm, and the content is preferably in a range of 0.001 to 0.30% by weight, more preferably in a range of 0.01 to 0.25% by weight. In a high-density magnetic recording medium, if particles with a mean particle diameter more than 0.30 μm are used, there is a case where the electromagnetic conversion property deteriorates.

In the polyester film with a two-layer structure, the thickness tB of the layer (B) is preferably in a range of 0.1 to 2.0 μm, more preferably in a range of 0.2 to 1.5 μm. If this thickness becomes less than 0.1 μm, the particles are likely to be fallen, and if more than 2.0 μm, there is a case where the effect for forming protrusions by the added particles decreases.

In the polyester film with a two-layer structure, the particles to be contained in the layer (B) may be either one kind or two or more kinds. The ratio of the lamination thickness Tb of the polyester layer (B) to a mean particle diameter dII of largest inert particles II added to the layer (B) (tB/dII) is preferably 0.3 or more and less than 1.0, more preferably 0.4 or more and less than 0.8. If the (tB/dII) is 1.0 or more, the surface of the layer (B) becomes too rough, and there is a case where the roughness is transferred to the surface applied with a magnetic layer and even at a time of room temperature the microplanarity deteriorates. The mean particle diameter dII of the inert particles II is preferably in a range of 0.3 μm to 1.0 μm, more preferably in a range of 0.4 μm to 0.9 μm. The content of the inert particles II is preferably in a range of 0.002% by weight to 0.10% by weight, more preferably in a range of 0.005 to 0.05% by weight. It is preferred that the mean particle diameter of inert particles III is smaller than that of the particles II. The mean particle diameter of the inert particles III is preferably in a range of 0.1 μm to 0.5 μm, more preferably in a range of 0.2 μm to 0.4 μm. The content of the inert particles III is preferably in a range of 0.1% by weight to 1.0% by weight, more preferably in a range of 0.2 to 0.4% by weight.

In the polyester film with a two-layer structure, as the inert particles contained in the layer (A) and the layer (B), inorganic particles such as spherical silica, aluminium silicate, titanium dioxide or calcium carbonate, and other than those, as organic polymer particles, crosslinked polystyrene resin particles, crosslinked silicone resin particles, crosslinked acrylic resin particles, crosslinked styrene-acrylic resin particles, crosslinked polyester resin particles, polyimide particles or melamine resin particles, are preferred. One or two or more kinds of these particles are selectively used.

In the polyester film with a two-layer structure, the inert particles contained in the layer (A) and the layer (B) are preferably uniform in particle shape and particle distribution, and the volume shape factor "f" is preferably in a range of f=0.3 to π/6, more preferably in a range of f=0.4 to π/6. The volume shape factor "f" is expressed by the following equation.

$$f = V/Dm^3$$

Where, "V" is a volume of a particle (μm³), and Dm is a maximum diameter (μm) in the plane of projection of the particle.

Where, when the particle is a sphere, the volume shape factor "f" exhibits the maximum of π/6 (=0.52). It is preferred to carry out filtration and the like as needed. In particular, spherical silica particles are preferable because they are excellent in mono-dispersion property, forming the protrusions can be easily controlled, and the advantage according to the present invention can be exhibited better. Further, as needed, from the viewpoint of reinforcing the skin, inert particles such as α-type alumina, γ-type alumina, δ-type alumina, θ-type alumina, zirconia, silica or titanium particles having a primary particle diameter of 0.005 to 0.10 μm, preferably 0.01 to 0.05 μm, may be contained in a range which does not affect forming the surface protrusions.

In the biaxially oriented polyester films according to the first and second embodiments of the present invention, it is preferred that each of Young's modulus in the longitudinal direction of the film and Young's modulus in the transverse direction is in a range of 3500 to 10000 MPa. The ratio of Young's modulus in the longitudinal direction of the film to Young's modulus in the transverse direction (longitudinal direction/transverse direction) is preferably in a range of 0.7 to 2.5, more preferably in a range of 1.2 to 2.4, and further preferably in a range of 1.5 to 2.3. If the ratio of Young's modulus in the longitudinal direction of the film to Young's modulus in the transverse direction (longitudinal direction/transverse direction) is less than 0.7, because the dimensional change in the transverse direction when a tension is applied in the longitudinal direction becomes great, there is a case where a track shift occurs. In order to make the ratio of the Young's modulus more than 2.0, it is necessary to apply a fairly large draw ratio for stretching in the longitudinal direction, and there is a case where film breakage frequently occurs during film forming.

In a linear recording system, generally, it is preferred that the dimensional change rate in the transverse direction when a tension is applied in the longitudinal direction is small, from the viewpoint of preventing track shift. The dimensional change in the transverse direction, when a load of 32 MPa is applied in the longitudinal direction and the film is treated at a temperature of 49° C. and a humidity of 90% RH for 72 hours, is preferably in a range of −0.40 to 0%, more preferably in a range of −0.30 to −0.10%. If less than −0.35%, there is a case where a track shift occurs when used as a magnetic tape. The greater the Young's modulus in the longitudinal direction is, the smaller the dimensional change rate tends to become, and the Young's modulus in the longitudinal direction is preferably 5,000 MPa or more, more preferably 6,000 MPa or more. However, if the Young's modulus in the longitudinal direction becomes more than 10,000 MPa, the draw ratio for stretching during forming the film becomes high, and there is a case where film breakage frequently occurs and the yield for making products deteriorates remarkably. On the other hand, if the strength in the longitudinal direction becomes smaller than 3,500 MPa, there is a case where a sufficient strength cannot be obtained when formed as a magnetic tape.

In the biaxially oriented polyester films according to the first and second embodiments of the present invention, it is preferred that the thermal expansion coefficient in the transverse direction of the film is preferably in a range of $-10 \times 10^{-6}$ to $20 \times 10^{-6}/°$ C., more preferably in a range of $-5 \times 10^{-6}$ to $15 \times 10^{-6}/°$ C. Further, it is preferred that the humidity expansion coefficient in the transverse direction of the film is preferably in a range of 0 to $20 \times 10^{-6}/\%$ RH, more preferably in a range of $5 \times 10^{-6}$ to $15 \times 10^{-6}/\%$ RH. If the thermal expansion coefficient and the humidity expansion coefficient exceed these ranges, when a difference in temperature or in humidity between the time of writing data and the time of reading the data is great, there is a case where the magnetic information written on the tape cannot be read properly. In order to properly read the data even if there is an environmental change in temperature/humidity, the respective expansion coefficients are controlled preferably within the above-described respective ranges.

In the biaxially oriented polyester films according to the first and second embodiments of the present invention, a layer for easy adhesion may be provided by applying a water soluble coating material or a coating material of organic solvent group onto at least one surface within a range which does not damage the advantage according to the present invention.

The thickness of a polyester film used as the biaxially oriented polyester films according to the first and second embodiments of the present invention is preferably in a range of 2.0 to 7.0 µm, more preferably in a range of 4.0 to 6.5 µm, from the viewpoint of advanced thinning of film accompanying with making the capacity high. If thicker than 7.0 µm, the length of the tape incorporated into a cassette becomes shorter, and there is a case where a sufficient recording capacity cannot be obtained. If the thickness of the polyester film is less than 2.0 µm, there is a case where a sufficient strength cannot be obtained when formed as a tape.

Next, a preferable method for producing the biaxially oriented polyester films according to the present invention will be explained.

First, as the method for containing inert particles in the polyester, for example, inert particles I are dispersed into ethylene glycol of diol component in a form of slurry at a predetermined rate, and this ethylene glycol slurry is added at an arbitrary stage before completion of polymerization of polyester. Where, when the particles are added, for example, if water sol or alcohol sol obtained at the time of synthesis of particles is added without being once dried, the dispersion property becomes better, and the slipping property and the electromagnetic conversion property can be both made better. Further, a method for mixing water slurry of particles directly with predetermined polyester pellets and supplying the mixture to a vent-type twin-screw kneading extruder to knead the mixture into polyester is also effective for obtaining the advantage according to the present invention. As the method for adjusting the content of particles, a method is effective wherein a high-density particle master is prepared and the content of particles is adjusted at the time of forming the film by diluting the master with polyester which substantially does not contain particles.

The polyester pellets prepared by the above-described method are blended at a predetermined rate, after dried, they are supplied to a known extruder for melt lamination, and the polymer is filtrated by a filter. In the use of a high-density magnetic recording medium coated with a very thin magnetic layer, because even very small foreign materials cause DO (dropout) which is a defect of magnetic recording, it is effective to use, for example, a filter with a high accuracy capable of trapping foreign materials with a size of 1.5 µm or more as the above-described filter. Successively, the polymer is delivered out from a slit die with a slit in a sheet-like form, and it is cooled and solidified on a casting roller to make a non-stretched film. Namely, using one to three extruders and a manifold or a feed block (for example, a feed block having a rectangular joining portion), as needed, carrying out lamination, the sheet is extruded from a die, and the sheet is cooled by a casting roller to make a non-stretched film. In this case, a method for installing a static mixer, a gear pump in the polymer path is effective from the viewpoint of making the back pressure stable and suppressing the fluctuation of the thickness.

The process of stretching may be either a sequential biaxial stretching or a simultaneous biaxial stretching.

In the simultaneous biaxial stretching is more preferable, because there is no contact between the film and the rollers during stretching, a local heating on the film surface is not likely to occur, and the microscopic Raman crystallization index is easily controlled, and therefore, it is more preferable.

The non-stretched film is stretched in the longitudinal and transverse directions at a stretching temperature of, for example, 80 to 130° C., preferably stretched simultaneously at a temperature of 85 to 110° C. If the stretching temperature is lower than 80° C., the film is liable to break, and if the stretching temperature is higher than 130° C., when used as a magnetic recording medium, there is a case where a sufficient strength cannot be obtained. Further, from the viewpoint of preventing stretching unevenness, the total draw ratio is set, for example, in a range of 4 to 20 times, preferably in a range of 6 to 15 times. If the draw ratio for stretching is less than 4 times, there is a case where a necessary and sufficient strength cannot be obtained for a high-density magnetic recording medium which is a target of the present invention. On the other hand, if the draw ration is more than 20 times, film breakage is liable to occur, and there is a case where stable film production becomes difficult. In order to obtain a strength necessary for a high-density magnetic recording medium, a re-stretching is carried out in the longitudinal direction and/or in the transverse direction at a temperature of 140 to 200° C., preferably, 160 to 190° C. Further, in order to obtain a strength necessary for a high-density magnetic recording medium, a re-stretching is carried out at draw ratio of 1.2 to 2.0 times, preferably, 1.3 to 1.7 times. Thereafter, a heat setting is carried out, for example, at 205 to 235° C., preferably, at 210 to 220° C., for example, for 0.5 to 20 seconds, preferably, for 1 to 15 seconds. If the temperature for heat setting is lower than 205° C., the structure is not stabilized because the crystallization of the film does not proceed, and there is a case where the microplanarity deteriorates by high-temperature storage or heat shrinkage during heat loading. On the other hand, if higher than 235° C., relax of amorphous chain portions of polyester proceeds, and there is a case where the Young's modulus becomes small. Further, in order to achieve the purpose of the present invention, a difference in temperature between the upper and lower portions of the film is controlled, for example, at 20° C. or less, preferably, at 10° C. or less, more preferably, at 5° C. or less. If the difference in temperature between the upper and lower portions of the film is more than 20° C., the microscopic Raman crystallization index in the thickness direction does not become uniform, and there is a case where the microplanarity deteriorates during heat loading.

In the simultaneous biaxial stretching, because the film is heated only by high-temperature air differently from contact heating by rollers, a local heating is hard to occur. On the other hand, because in the simultaneous biaxial stretching all zones from a zone at a first stretching temperature around 90° C. to a zone at a heat setting temperature around 220° C. are connected in the longitudinal direction, it is a stretching method in which a difference in temperature is liable to occur between upper and lower portions of the film and in the transverse direction by a free flow of high-temperature air such as an accompanying air flow. Although a method for reducing the difference in temperature is not particularly limited, it is effective to provide an equipment such as a shutter for suppressing a free flow of high-temperature air between zones having temperatures different from each other. In particular, in order to make a film suppressing dispersion of microscopic Raman crystallization index characterized by the present invention, for example, the gap between the film and the shutter is set preferably in a range of 1 to 250 mm, more preferably in a range of 2 to 100 mm, and further preferably in a range of 3 to 50 mm. If the gap is less than 1 mm, there is a case where the film comes into contact with the shutter and the film is broken. If the gap is more than 250 mm, there is a case where the dispersion of microscopic Raman crystallization index becomes great and the microplanarity deteriorates. In order to avoid the contact between the film and the shutter, it is effective to appropriately adjust the wind speed of air blown from a nozzle.

On the other hand, the biaxially oriented polyester film according to the present invention also can be produced by employing sequential stretching. In a case of the sequential stretching, first longitudinal stretching is important, and the stretching temperature is, for example, in a range of 90 to 130° C., preferably in a range of 100 to 120° C. If the stretching temperature is lower than 90° C., the film is likely to break, and if the stretching temperature is higher than 130° C., there is a case where the film surface is thermally damaged. Further, from the viewpoint of preventing unevenness in stretching and scratches, it is preferred to separate the stretching into two or more stages, and the total draw ratio is, for example, in a range of 2.5 to 3.5 times, preferably in a range of 2.8 to 3.3 times. If the draw ratio is less than 2.5 times, there is a case where a strength necessary for a magnetic recording medium cannot be obtained. On the other hand, if the draw ratio is more than 3.5 times, not only the film becomes hard to be used as a magnetic recording medium because scratches are liable to occur, but also there is a case where the film is broken in a re-stretching in the longitudinal direction.

Further, non-adhesive silicone rollers easy to control the surface roughness and the like are preferable as the stretching rollers. When ceramic or "Teflon" (registered trade mark) rollers, further, metal rollers, are used as in the conventional technology, only a film surface is locally heated by adhesion, and there is a case where a dispersion in microscopic Raman crystallization occurs between the film surface and the interior of the film. Further, the surface roughness of the stretching roller Ra is, for example, in a range of 0.005 to 1.0 μm, preferably in a range of 0.1 to 0.6 μm. If the Ra is more than 1.0 μm, there is a case where the unevenness of the surface of the stretching roller is transferred to the film surface. If the Ra is less than 0.005 μm, there is a case where the skins of the roller and the film adhere to each other and the film is likely to be thermally damaged. In order to control the surface roughness, it is effective to appropriately adjust the particle size of abrasive powder and the number of the times of grinding. Furthermore, it is particularly effective to set the total contact time between the roller and the film in the stretching portion at a time of, for example, 0.1 second or less, preferably 0.08 second or less. If the contact time between the roller and the film is longer than 0.1 second, there is a case where only the film surface is locally heated by the heat of the stretching roller, there occurs a dispersion in microscopic Raman crystallization index between the film surface and the interior of the film, and ultimately, the microplanarity at the time of heat loading deteriorates. Where, the contact time means a time obtained by dividing the contact length between the film and the stretching roller by a film speed at the entrance of the roller, and when the stretching is carried out by a plurality of rollers, it means the total times thereof. As the method for shortening the contact time, although a method for stretching the film at a condition of winding the film on the roller is possible, for example, it is particularly effective to stretch the film between nip rollers at a parallel condition without winding the film on a roller.

In the sequential stretching, the stretching in the transverse direction is then carried out preferably at 85 to 140° C., more preferably at 90 to 110° C., at a draw ratio of preferably 2.5 to 4.5 times, more preferably 3.0 to 3.5 times. If the condition is out from such ranges of the temperature and the draw ratio, there is a case where a problem such as uneven stretching or film breakage occurs and it is difficult to obtain a film characterized by the present invention. In order to obtain the microscopic Raman crystallization index aimed in the present invention, it is preferred to re-stretch the film on the longitudinal direction preferably at 130 to 160° C., more preferably at 135 to 145° C., at a draw ratio of preferably 1.4 to 2.0 times, more preferably 1.6 to 1.8 times. In particular, if the stretching temperature is lower than 130° C., there is a case where the film is broken. On the other hand, a condition where the stretching temperature is higher than 160° C. is not preferred because the film surface is damaged by the heat. Further, if the draw ratio is less than 1.4 times, there is a case where a sufficient tape strength cannot be obtained, and if more than 2.0 times, there is a case where the film is broken. Thereafter, for example, after the film is re-stretched in the longitudinal direction at a draw ratio of 1.0 to 1.5 times, the heat setting is carried out preferably at 205 to 235° C., more preferably at 210 to 220° C., preferably for 0.5 to 20 seconds, more preferably for 1 to 15 seconds. In particular, if the temperature for heat setting is lower than 205° C., the structure is not stabilized because the crystallization of the film does not proceed, and there is a case where the microplanarity deteriorates at the time of high-temperature storage or heat loading. On the other hand, if higher than 235° C., there is a case where the relax of amorphous chain portion proceeds and the Young's modulus becomes small. Further, in order to achieve the object of the present invention, the difference in temperature between upper and lower portions of the film is preferably 20° C. or less, more preferably 10° C. or less, and further preferably 5° C. or less. If the difference in temperature between upper and lower portions of the film is greater than 20° C., the microscopic Raman crystallization index in the thickness direction does not uniform, and there is a case where the microplanarity deteriorates at the time of heat loading. Thereafter, it is preferred to carry out a relax treatment at 0.5 to 7.0% in the longitudinal and/or transverse direction.

EXAMPLES

Hereinafter, the present invention will be explained in detail by examples.

The methods for determining the properties and estimating the effects according to the present invention are as follows.

A. Mean Particle Diameter of Particles:

Polymer was removed from a film by plasma low-temperature ashing treatment to expose particles. The condition of the ashing treatment was selected such that the particles were not damaged so much whereas the polymer is ashed. The exposed particles were observed by a scanning electron microscope (SEM) and the image of the particles was processed by an image analyzer. The magnification of the SEM was selected appropriately from about 5,000 to 20,000 times. Changing the portions to be observed, the volume mean diameter "d" of the particles of not less than 5,000 was determined from the diameters and volume rates thereof by the following equation. In a case where two or more kinds of particles having different diameters were contained, similar determination was conducted as to the respective particles, and the respective particle diameters were determined.

$$d = \Sigma(di \cdot Nvi)$$

Where, di is a particle diameter, and Nvi is a volume rate thereof.

In a case where the particles were greatly damaged by the plasma low-temperature ashing treatment, the cross section of the film was observed at a magnification of 3,000 to 100,000 times, using a transmission type electron microscope (TEM). The thickness of a cut sample for the measurement of the TEM was set to about 100 nm, 500 or more fields were measured changing the fields, and the volume mean diameter "d" of the particles was determined from the above equation.

B. Volume Shape Factor of Particles:

The photograph of particles was taken by a scanning electron microscope, for example, at a magnification of 5,000 times by 10 fields. Further, using an image analyzer, the maximum diameter in the plane of projection and the mean volume of particles were calculated, and the volume shape factor was determined by the following equation.

$$f = V/Dm^3$$

Where, V is a mean volume of particles ($\mu m^3$), and Dm is a maximum diameter in a plane of projection ($\mu m$).

C. Lamination Thickness of Film:

The depth profile of the particle density was determined by XPS (X-ray photoelectron spectrum, IR (infrared spectroscopic analysis) or a confocal microscope while etching from the surface. In the surface of a surface layer of a laminated film, the particle density is low because the surface forms an air-resin interface, and the particle density increases as the measuring position is apart from the surface. In the film laminated with a layer on one surface according to the present invention, the particle density once becomes the maximum at a depth [I] and thereafter decreases again. Based on this distribution curve of the particle density, a depth [II] which indicates ½ of the maximum of the particle density was defined as the lamination thickness (where, II>I).

Further, in a case where inorganic particles and the like were contained, using an apparatus of secondary ion mass spectrum (SIMS), the ratio of the density of the element originating from the particles present at the highest density in the film to the density of the carbon in the polyester (M+/C+) was defined as the particle density ratio, and the determination was carried out from the surface of the layer (A) in the depth direction (thickness direction). The lamination thickness was determined in a manner similar to the above-described manner.

D. Microscopic Raman Crystallization Index:

A sample was enclosed in an epoxy resin, and a section was created by grinding. Microscopic Raman crystallization indexes were measured at respective points positioned at an interval of 1 μm in the thickness direction (for example, for a 6 μm film, six points, and for a 4.5 μm film, four points) in 5 places different from each other in the plane direction, respective average values for the same positions in the thickness direction was calculated, and from the values, the maximum value, the minimum value and a difference between the maximum value and the minimum value were calculated. As to the plane direction, after the section was made by cutting, respective sections each present from the film surface to a position of a depth of 1 μm, which were positioned at 6 points in each of the longitudinal and transverse directions at an interval of 2 mm (corresponding to the width of ½ tape) totally at 12 points, were measured at the following conditions by laser Raman microprobe method (spatial resolution: 1 μm), and the dispersion was calculated. The half band width at 1730 cm$^{-1}$ (stretching vibration of carbonyl group) was defined as the microscopic Raman crystallization index Ic, and the difference between the maximum value and the minimum value was defined as ΔIc.

The measuring conditions of the laser Raman spectrometry are as follows.

Apparatus: "Ramanor" U-1000 manufactured by Jobin Yvon Corporation

Micro probe: Microscope; BH-2 type manufactured by Olympus Corporation Beam spritter; right Objective lens; ×100

Light source: Ar$^{30}$ laser, GLG3300 manufactured by NEC Corporation Wave length; 514.5 nm Spectroscope: Constitution; 1 m Czerny-Turner type double monochromater Diffraction grating; Plane holographic, 1,800 g/mm, 110×110 mm Dispersion; 9.23 cm$^{-1}$/mm Stray light rejection ratio; 10$^{-14}$ (20 cm$^{-1}$)

Detector: PM RCA31034, 943-02 manufactured by Hamamatsu Electronics Corporation MCD DARSS TN-6122(Tracor Northern)

E. Young's modulus of film:

According to JIS-K7127, the Young's modulus was determined at 23° C. and 65% RH using an Instron type tensile tester. The measurement was carried out by stretching a sample film which was cut in the longitudinal direction (MD) and transverse direction (TD) of the film in a form having a width of 10 mm and a length of 100 mm.

F. Thermal expansion coefficient:

A film was sampled at a width of 4 mm, and the sample was set at a specimen length of 15 mm to a device of TMA TM-3000 and a heating controller TA-1500 manufactured by Shinku Rikoh Corporation. After the temperature was elevated from a room temperature (23° C.) to 50° C. while a load of 0.5g was applied to the film, the temperature was once returned to the room temperature. Thereafter, the temperature was elevated again from the room temperature to 50° C. At that time, a displacement change of the film (ΔL mm) from 30° C. to 40° C. was measured, and the thermal expansion coefficient was calculated by the following equation.

Thermal expansion coefficient (/° C.)=(ΔL/15)/(40-30)

G. Humidity expansion coefficient:

A film was sampled at a width of 10 mm, the sample was set at a specimen length of 200 mm to a tape elongation tester manufactured by Ohkura Industries Corporation, and after the humidity was changed from 40% RH to 80% RH at a temperature of 30° C. and the condition was kept for 30 minutes, the displacement (ΔL mm) was measured, and the humidity expansion coefficient was calculated by the following equation.

Humidity expansion coefficient (% RH)=(ΔL/200)/(80-40)

H. Heat shrinkage:

A film was cut in the longitudinal and transverse directions at a width of 10 mm and a length of 250 mm, two reference lines were provided at a distance of about 200 mm, and the distance was measured at 23° C. (this was referred to as X mm). At a condition where a load of 0.15g was applied to the tip of this sample, the distance between the reference lines was measured again at 23° C. (this was referred to as Y mm), and the heat shrinkage was defined by the equation of 100×(X−Y)/X.

I. Dimensional change rate:

A film was cut in the longitudinal direction at 100 mm and in the transverse direction at 30 mm, after the humidity and the temperature were controlled for 24 hours under a non-loading condition at 23° C. and 65% RH, the sample was stuck by static electricity onto a chrome mask manufactured by Dainippon Insatsu Corporation, and the length in the transverse direction (L0) was measured using an optical microscope. Thereafter, the sample was left for 72 hours at a condition where a load of 32 MPa was applied in the longitudinal direction under a condition of 49° C. and 90% RH. After 72 hours, the load was released, and after the sample was controlled in humidity and temperature for 24 hours at a condition of 23 °C., 65% RH and no load, and thereafter the length in the transverse direction (L1) was measured. The dimensional change rate in the transverse direction was determined by the following equation.

Dimensional change rate (%)=[(L1−L0)/L0]×100

J. Surface roughness of stretching roller:

Using a surface roughness meter "Surftest" 301 manufactured by Mitutoyo Corporation, center plane average roughnesses were measured at a cut off of 0.25 mm at three points in the width direction of a roller, and the average value thereof was employed.

K. Estimation of microplanarity due to heat treatment:

The heat treatment was carried out by leaving a film for 24 hours in an oven controlled at 100° C. The microplanarities of layer (A) before and after the heat treatment were determined at a measurement area magnification of 41.6 times and an area for measurement of 239×239 μm (0.057 mm$^2$) using a non-contact type three dimensional roughness meter TOPO-3D manufactured by WYKO Corporation. By an analyzing soft (ver. 4.90) incorporated into the roughness meter, the relative powers at spatial frequencies of 10 mm$^{-1}$ and 200 mm$^{-1}$ were determined. The measurement was carried out ten times, and the average value was defined as the relative power. As to WRa, only the film before the heat treatment was measured.

Where, the relative power is a value expressing a power spectrum P (fx, fy) at each spatial frequency by logarithmic scale, and it is standardized in the analyzing soft so that a surface undulation of P (fx, fy) of 1 nm$^2$ is represented as 0 dB. The measurement was carried out at a condition where "x" was referred to as the transverse direction of the film and "y" was referred to as the longitudinal direction of the film. P (fx, fy) is calculated by the following respective equations.

$$P(fx,fy)=(1/A)\{FT[h(x,y)]\}^2 \qquad \text{Equation 1}$$

In the equation, P (fx, fy) is a power spectrum, A is an area of data region, FT is a Fourier transform operation defined by $\int\int h(x,y)\exp[i2\pi(x \cdot fx + y \cdot fy)]$, h(x,y) is a surface profile data, and fx and fy are spatial frequency coordinates.

$$\overline{W\!Ra} = \frac{1}{MN}\sum_{k=1}^{M}\sum_{j=1}^{N}|Z_{jk}-\overline{Z}| \qquad \text{[Equation 2]}$$

Where, $$\overline{Z} = \frac{1}{MN}\sum_{k=1}^{M}\sum_{j=1}^{N}|Z_{jk}|$$

Zjk is a height in a three dimensional roughness chart at each of "j" position and "k" position in each direction when each of the measurement direction and a direction perpendicular to the measurement direction is divided by each number of M and N.

A spatial frequency 10 (1/mm) and a difference in intensity between spatial frequencies 10 (1/mm) and 200 (1/mm) are read, and the values are represented as $I^{10}{}_{TD}$ and $I^{10\text{-}200}{}_{TD}$, respectively. These values indicate degrees of microplanarity of the film surface, and the greater in the plus side the value is, the worse the microplanarity is. The measuring equipment is not limited by WYKO, and a non-contact three dimensional roughness meter ZYGO or an atomic force microscope AFM capable of measuring similarly may be employed.

K. Estimation of microplanarity:

In order to indicate that the greater the difference in $I^{10\text{-}200}{}_{TD}$ between before and after the heat treatment is, the microplanarity has deteriorated by the heat treatment, it was estimated by the following standard.

The difference in $I^{10\text{-}200}{}_{TD}$ between before and after the heat treatment is 0 dB or more and less than 2 dB:○○

The difference in $I^{10-200}{}_{TD}$ between before and after the heat treatment is 2 dB or more and less than 4 dB: ○

The difference in $I^{10-200}{}_{TD}$ between before and after the heat treatment is 4 dB or more: × ○○ and ○ are determined to be acceptable.

EXAMPLE 1

Polyethylene terephthalate pellets containing spherical silica particles having a mean particle diameter of 0.06 μm and a volume shape factor of f=0.51 and polyethylene terephthalate pellets which substantially did not contain particles were prepared, and the two kinds of pellets were mixed to prepare thermoplastic resin A so that the content of the spherical silica particles became 0.2% by weight. Further, polyethylene terephthalate pellets containing divinyl benzene/styrene crosslinked copolymer particles having a mean diameter of 0.3 μm and a volume shape factor of f=0.52, polyethylene terephthalate pellets containing divinyl benzene/styrene crosslinked copolymer particles having a mean particle diameter of 0.8 μm and a volume shape factor of f=0.52 and polyethylene terephthalate pellets which substantially did not contain particles were prepared, and these pellets were mixed to prepare thermoplastic resin B so that the content of the 0.3 μm particles became 0.26% by weight and the content of the 0.8 μm particles became 0.01% by weight, respectively.

After these thermoplastic resins were dried at a pressure-reduced condition at 160° C. for 8 hours, respectively, they were supplied to extruders different from each other, and after melt extruded at 275° C. and filtered at a high precision, the polymers were joined and laminated by a rectangular two-layer feed block to make a two-layer lamination structure. Thereafter, it was delivered out from a slit die controlled at 285° C. and was wound onto a casting drum with a surface temperature of 25° C. employing an electrostatic application casting method, and it was cooled and solidified to prepare a non-stretched laminated film.

This non-stretched laminated film was stretched in the longitudinal and transverse directions by a linear motor type simultaneous biaxial stretching apparatus at 95° C. and each draw ratio in each of longitudinal and transverse directions of 3.5 times, a total draw ratio of 12.3 times, and thereafter, it was stretched in the longitudinal direction at 180° C. and a draw ratio of 1.5 times, and heat treated at 220° C. for 3 seconds under a condition of constant length. The distance between the film and a shutter was set at 20 mm, and the difference in temperature between the upper and lower portions of the film was controlled at 1° C. Thereafter, relax treatment by 2% in the transverse direction was carried out to obtain a film having a total thickness of 6 μm and a thickness of layer (B) of 0.5 μm. The result of estimation of the film obtained is shown in Tables 1, 2 and 3.

EXAMPLE 2

A biaxially oriented polyester film was obtained similarly in Example 1 other than conditions where were changed the particle diameters of particles added to layer (A) and layer (B) (f=0.52), the contents, the draw ratios in the longitudinal and transverse directions, and the difference in temperature between the upper and lower portions of the film to 10° C. The result of estimation of the film obtained is shown in Tables 1, 2 and 3.

EXAMPLE 3

A biaxially oriented polyester film was obtained similarly in Example 1 other than conditions where polyethylene terephthalate pellets containing spherical silica particles having a mean particle diameter of 0.10 μm and a volume shape factor of f=0.51 and polyethylene terephthalate pellets which substantially did not contain particles were prepared, the two kinds of pellets were mixed to prepare a thermoplastic resin so that the content of the spherical silica particles became 0.1% by weight, and a single-layer film having a thickness of 5 μm was prepared. The result of estimation of the film obtained is shown in Tables 1, 2 and 3.

EXAMPLE 4

A biaxially oriented polyester film was obtained similarly in Example 1 other than a condition where the temperature for heat setting was controlled at 240° C. The result of estimation of the film obtained is shown in Tables 1, 2 and 3.

EXAMPLE 5

A non-stretched laminated film was prepared similarly in Example 1 other than conditions where the content of particles added to layer (A) and the thicknesses of layer (A) and layer (B) were changed, and it was stretched by a sequential biaxial stretching process. First, the film was stretched in the longitudinal direction at a stretching temperature of 110° C. and a draw ratio of 3.1 times at separated two stages. At that time, non-adhesive silicone rollers each having a surface roughness Ra of 0.40 μm were used as the stretching rollers, and the film was stretched between nip rollers at a parallel condition. In this stretching, the contact length between the film and the rollers at the nip portions was 4 mm, the contact time between the film and the rollers was 0.011 second in the first stage, 0.009 second in the second stage, totally 0.02 second. Thereafter, the uniaxially stretched film was stretched in the transverse direction by a tenter at a temperature of 95° C. and a draw ratio of 3.2 times, and then, the film was stretched again in the longitudinal direction at 140° C. and a draw ratio of 1.7 times, and heat treated at 210° C. for 3 seconds under a condition of constant length. The difference in temperature between the upper and lower portions of the film was controlled at 1° C. Thereafter, 2% relax treatment in the transverse direction was carried out to obtain a film having a total thickness of 4.5 μm and a thickness of layer (B) of 0.4 μm. The result of estimation of the film obtained is shown in Tables 1, 2 and 3.

EXAMPLE 6

A biaxially oriented polyester film was obtained similarly in Example 5 other than conditions where were changed the particle diameters and the content of particles added to layer (B), and the contact time between the film and the rollers to 0.022 second for the first stage, to 0.018 for the second stage and to 0.04 second as the total. The result of estimation of the film obtained is shown in Tables 1, 2 and 3.

Comparative Example 1

A biaxially oriented polyester film was obtained similarly in Example 5 other than conditions where the stretching temperature was changed to 125° C., ceramic rollers each having a surface roughness of 0.6 μm were used as the stretching rollers, and the difference in temperature between the upper and lower portions of the film was controlled at 10° C. The result of estimation of the film obtained is shown in Tables 1, 2 and 3.

Comparative Example 2

A biaxially oriented polyester film was obtained similarly in Example 5 other than conditions where the stretching temperature was changed to 125° C., ceramic rollers each having a surface roughness of 0.6 μm were used as the stretching rollers, and the contact time between the film and the rollers were changed to 0.40 second for the first stage, to 0.29 for the second stage and totally to 0.69 second, respectively, by winding the film onto the rollers. The result of estimation of the film obtained is shown in Tables 1, 2 and 3.

Comparative Example 3

A biaxially oriented polyester film was obtained similarly in Example 2 other than conditions where the draw ratios in the longitudinal and transverse directions were changed, the temperature for heat setting was changed to 200° C., the distance between the film and the shutter was changed to 250 mm, and the difference in temperature between the upper and lower portions of the film was controlled at 30° C. The result of estimation of the film obtained is shown in Tables 1, 2 and 3.

TABLE 1

| | Film thickness | | | Layer (A) | | | Layer (B) | | | | | |
|---|---|---|---|---|---|---|---|---|---|---|---|---|
| | Total thickness [μm] | $t_B$ [μm] | $t_B$/dIII | Inert particles I dI [μm] | Concentration [% by weight] | $WRa^A$ [nm] | Inert particles II dII [μm] | Concentration [% by weight] | Inert particles III dIII [μm] | Concentration [% by weight] | $WRa^B$ [nm] | Stretching process |
| Example 1 | 6.0 | 0.5 | 0.63 | 0.06 | 0.2 | 0.8 | 0.8 | 0.01 | 0.3 | 0.26 | 4.4 | Simultaneous biarial stretching |
| Example 2 | 6.0 | 0.5 | 0.63 | 0.3 | 0.1 | 4.5 | 0.8 | 0.05 | 0.3 | 0.60 | 6.8 | Simultaneous biarial stretching |
| Example 3 | 5.0 | — | — | 0.1 | 0.1 | 2.5 | — | — | — | — | — | Simultaneous biarial stretching |
| Example 4 | 6.0 | 0.5 | 0.63 | 0.06 | 0.2 | 0.7 | 0.8 | 0.01 | 0.3 | 0.26 | 4.5 | Simultaneous biarial stretching |
| Example 5 | 4.5 | 0.4 | 0.50 | 0.06 | 0.05 | 0.7 | 0.8 | 0.01 | 0.3 | 0.26 | 4.3 | Sequential biaxial stretching |
| Example 6 | 4.5 | 0.4 | 1.33 | 0.06 | 0.05 | 0.7 | 0.3 | 0.01 | 0.06 | 0.10 | 2.8 | Sequential biaxial stretching |
| Comparative Example 1 | 4.5 | 0.4 | 0.50 | 0.06 | 0.05 | 1.0 | 0.8 | 0.01 | 0.3 | 0.26 | 4.4 | Sequential biaxial stretching |
| Comparative Example 2 | 4.5 | 0.4 | 0.50 | 0.06 | 0.05 | 1.4 | 0.8 | 0.01 | 0.3 | 0.26 | 4.4 | Sequential biaxial stretching |
| Comparative Example 3 | 6.0 | 0.5 | 0.63 | 0.3 | 0.1 | 4.7 | 0.8 | 0.05 | 0.3 | 0.60 | 7.0 | Simultaneous biarial stretching |

TABLE 2

| | Film property | | | | | | | | | |
|---|---|---|---|---|---|---|---|---|---|---|
| | Young's modulus in longitudinal direction [MPa] | Young's modulus in transverse direction [MPa] | Longitudinal/transverse | Longitudinal + transverse Young's moduli [MPa] | Thermal expansion coefficient [$10^{-6}$/° C.] | Humidity expansion coefficient [$10^{-6}$/% RH] | Dimensional change rate in transverse direction [%] | Sum of heat shrinkages [%] | Heat shrinkage Longitudinal [%] | Transverse [%] |
| Example 1 | 8200 | 4200 | 2.0 | 12400 | 9 | 10 | −0.18 | 1.8 | 1.7 | 0.1 |
| Example 2 | 5000 | 7000 | 0.7 | 12000 | −1 | 6 | −0.40 | 2.1 | 1.7 | 0.4 |
| Example 3 | 8300 | 4100 | 2.0 | 12400 | 10 | 10 | −0.18 | 1.8 | 1.7 | 0.1 |
| Example 4 | 7100 | 3700 | 1.9 | 10800 | 14 | 14 | −0.26 | 0.9 | 1.2 | −0.3 |
| Example 5 | 8300 | 4200 | 2.0 | 12500 | 10 | 10 | −0.20 | 2.1 | 2.1 | 0.0 |
| Example 6 | 8200 | 4200 | 2.0 | 12400 | 10 | 11 | −0.20 | 2.1 | 2.0 | 0.1 |
| Comparative Example 1 | 8200 | 4200 | 2.0 | 12400 | 10 | 10 | −0.20 | 2.1 | 2.1 | 0.0 |
| Comparative Example 2 | 8200 | 4200 | 2.0 | 12400 | 10 | 10 | −0.20 | 1.8 | 1.7 | 0.1 |
| Comparative Example 3 | 5100 | 4400 | 1.2 | 9500 | 11 | 11 | −0.40 | 2.3 | 1.6 | 0.7 |

TABLE 3

| | Microscopic Raman crystallization index | | | | Spatial frequency | | | | |
| --- | --- | --- | --- | --- | --- | --- | --- | --- | --- |
| | Thickness direction | | | Plane direction | Film before heat treatment | | Film after heat treatment | | Microplanarity |
| | Maximum value | Minimum value | Δ Ic Thickness | Δ Ic | | | | | |
| | [cm$^{-1}$] | [cm$^{-1}$] | direction | Plane direction | $I^{10}{}_{TD}$ | $I^{10-200}{}_{TD}$ | $I^{10}{}_{TD}$ | $I^{10-200}{}_{TD}$ | 100° C. × 24 hr |
| Example 1 | 13.7 | 13.5 | 0.2 | 0.3 | −13.5 | 11.5 | −13.0 | 12.0 | ○○(0.5 dB) |
| Example 2 | 14.0 | 13.4 | 0.6 | 0.4 | −2.8 | 12.0 | −1.0 | 14.0 | ○(2.0 dB) |
| Example 3 | 13.6 | 13.4 | 0.2 | 0.3 | −5.7 | 13.3 | −5.0 | 14.0 | ○○(0.7 dB) |
| Example 4 | 12.9 | 12.7 | 0.2 | 0.2 | −13.4 | 11.5 | −13.0 | 11.9 | ○○(0.4 dB) |
| Example 5 | 13.9 | 13.2 | 0.7 | 0.5 | −11.3 | 13.7 | −8.0 | 17.0 | ○(3.3 dB) |
| Example 6 | 13.9 | 13.1 | 0.8 | 0.6 | −11.0 | 14.0 | −7.5 | 17.5 | ○(3.5 dB) |
| Comparative Example 1 | 14.5 | 13.3 | 1.2 | 1.4 | −2.8 | 21.7 | 2.5 | 26.8 | X(5.1 dB) |
| Comparative Example 2 | 15.1 | 13.3 | 1.8 | 2.3 | −0.5 | 24.0 | 5.5 | 30.0 | X(6.0 dB) |
| Comparative Example 3 | 16.0 | 14.8 | 1.2 | 0.5 | −3.2 | 11.8 | 1.1 | 16.1 | X(4.2 dB) |

INDUSTRIAL APPLICATIONS OF THE INVENTION

The biaxially oriented polyester film according to the present invention is useful as a polyester film used for a magnetic recording material, an electronic material, a stencil film, a sublimatic ribbon and a package material. In particular, the biaxially oriented polyester film according to the present invention is a biaxially oriented polyester film useful when employed as a base film for a high-density magnetic recording medium, especially, a double layer metal coated digital recording medium according to linear recording system.

The biaxially oriented polyester film according to the present invention is a film excellent in microplanarity even after high-temperature storage or heat loading during processing.

The invention claimed is:

1. A biaxially oriented polyester film wherein a microscopic Raman crystallization index Ic measured in the thickness direction of said film is in a range of 8 cm$^{-1}$ to 15 cm$^{-1}$ and the difference between the maximum value and the minimum value of said Ic is 1 cm$^{-1}$ or less.

2. The biaxially oriented polyester film according to claim 1, wherein the difference between the maximum value and the minimum value of a microscopic Raman crystallization index Ic measured in the plane direction of said film is 1 cm$^{-1}$ or less.

3. The biaxially oriented polyester film according to claim 1, wherein the sum of Young's modulus in the longitudinal direction and Young's modulus in the transverse direction is in a range of 11,000 to 15,000 MPa.

4. The biaxially oriented polyester film according to claim 1, wherein polyester is polyethylene terephthalate.

5. The biaxially oriented polyester film according to claim 1, wherein said film is used as a base film for a magnetic recording medium according to a linear recording system.

6. The biaxially oriented polyester film according to claim 1, wherein said film is used as a base film for a magnetic recording medium of a double layer metal coated digital recording type.

* * * * *